United States Patent Office 3,773,846
Patented Nov. 20, 1973

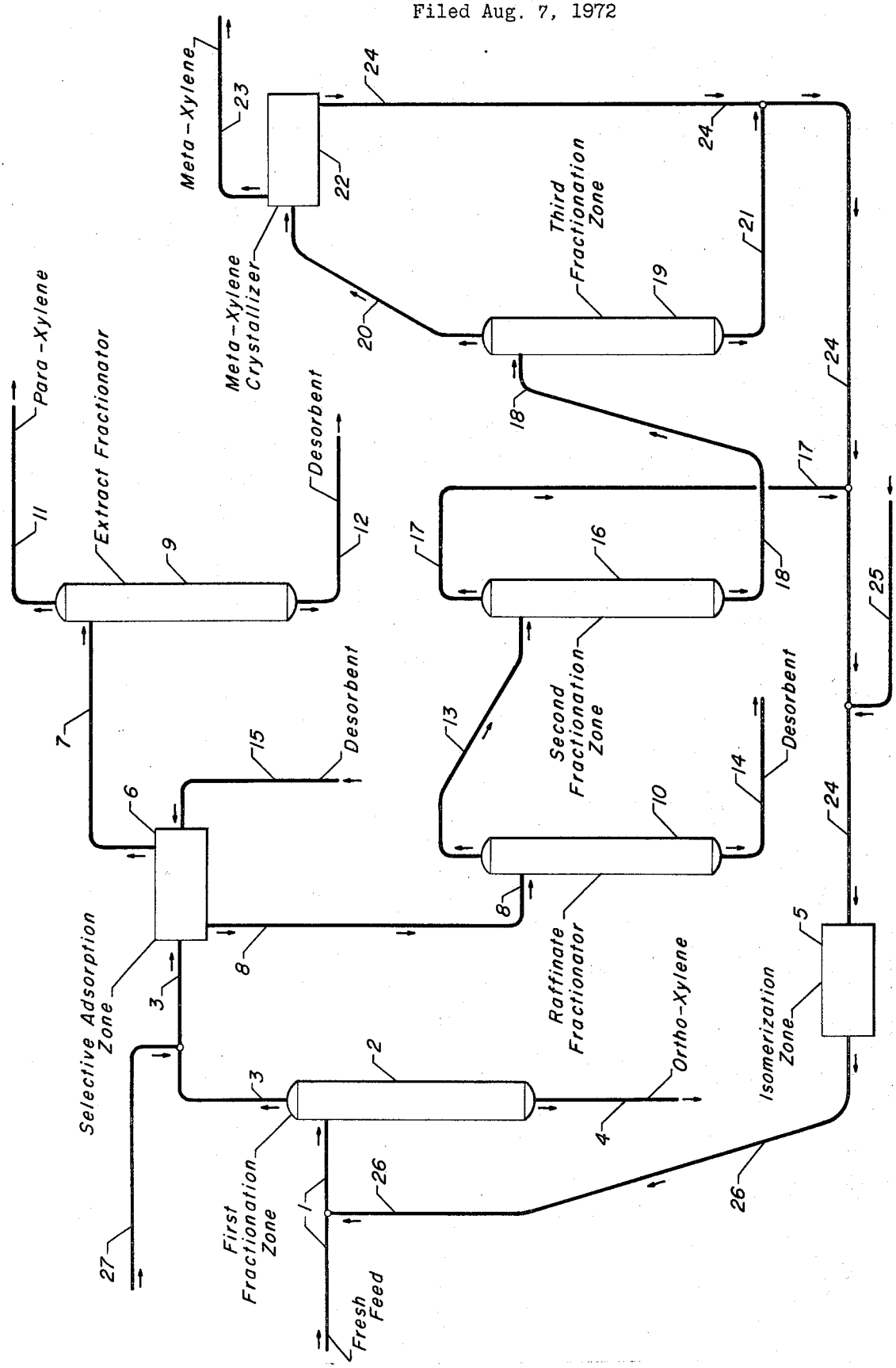

3,773,846
PROCESS FOR THE PRODUCTION OF HIGH PURITY META-XYLENE
Charles V. Berger, Western Springs, Ill., assignor to Universal Oil Products Company, Des Plaines, Ill.
Filed Aug. 7, 1972, Ser. No. 278,695
Int. Cl. C07c 7/02, 15/08
U.S. Cl. 260—674 A
11 Claims

ABSTRACT OF THE DISCLOSURE

High purity meta-xylene, along with high purity para-xylene and, if desired, high purity ortho-xylene, is recovered and produced from a $C_8$ aromatic mixture containing the xylene isomers and ethyl-benzene by a combination of fractionation, selective adsorption, fractional crystallization, and isomerization. The unique combination allows the recovery of high purity meta-xylene by reducing the concentration of para-xylene and ortho-xylene in the feed to the meta-xylene crystallizer below that of the para-xylene/meta-xylene eutectic mixture and the ortho-xylene/meta-xylene eutectic mixture.

BACKGROUND OF THE INVENTION

Field of the invention

The field of art to which the claimed invention pertains is hydrocarbon separation. In particular, the present invention pertains to a process for the recovery and production of high purity meta-xylene simultaneously with high purity para-xylene and if desired high purity ortho-xylene from a $C_8$ aromatic mixture containing the same in admixture with ethylbenzene. More particularly, the present invention pertains to a combination process utilizing the combined step of fractionation, selective adsorption separation, fractional crystallization, and isomerization to produce high purity meta-xylene as well as high purity para-xylene and high purity ortho-xylene if desired.

Description of the prior art

Each of the $C_8$ aromatic isomers, in their relatively pure form, is an important item of commerce as a raw material for various petrochemical products. For example, para-xylene is used in the production of dimethylterephthalate and terephthalic acid; ortho-xylene is used in the production of phthalic acid and phthalic anhydride; meta-xylene is used in the production of isophthalic acid; and, ethylbenzene is used to produce styrene. Although presently the demand for para-xylene is stronger than that for meta-xylene, there does exist a limited market for pure meta-xylene.

A typical $C_8$ aromatic feedstock which contains all of the $C_8$ aromatic isomers in varying quantities is not readily separated by fractional distillation into all of the individual isomers. Ortho-xylene, which has a boiling point 3.5° C. higher than that of the nearest other $C_8$ aromatic (meta-xylene), can be separated by conventional fractional distillation techniques. Such ortho-xylene towers will contain 100 to 150 trays and will operate with about a 5-8 to 1 reflux to feed ratio. Ethylbenzene can be separated with increased difficulty from such a $C_8$ aromatic mixture but only by more intricate super-fractionation since its boiling point is within 2.2° C. of the boiling point of para-xylene. Typical ethylbenzene fractionators contain 300 to 400 actual trays and require about a 25–50 to 1 reflux to feed ratio. Since the meta and para-xylenes differ by only 0.7° C. in boiling point, however, separation by distillation is essentially impossible and other means have to be used.

Although fractional crystallization may be used to recover para- or meta-xylene, the formation of eutectic mixtures results in mixed products and consequent low yields of the desired isomer. Up to about 85% purity meta-xylene can be recovered from a conventional para-meta crystallization process but higher purity is limited by the eutectic composition of about 86% meta-xylene and 14% para-xylene. Meta-xylene has also been separated by selective sulfonation or by $HF-BF_3$ extraction processing schemes. The use and recovery of corrosive and reactive acids, however, presents problems such as materials of construction, acid storage and recovery, and by-product disposal which would be avoided if purely physical separation techniques could be applied.

It is apparent that to such a separation as this, the application of selective adsorption techniques is well suited. Indeed, the applicant is aware of the abundance of prior art processes directed towards the separation of a particular isomer by selective adsorption on solid adsorbents, especially adsorption on certain zeolitic metallic aluminosilicates, as particularly exemplified by Fleck U.S. Pats. 3,133,126 and 3,114,782, and Neuzil U.S. Pats. 3,558,730, 3,558,732, 3,626,020 and 3,663,638. Such selective adsorption processes, as well as combination processes employing selective adsorption as a step of the process are generally directed toward the recovery of para-xylene as the desired or primary product. While such selective adsorption processes efficiently separate para-xylene, generally as an extract stream, the raffinate stream usually contains a mixture of at least two of the other $C_8$ aromatic isomers which, if separation is desired, requires subsequent processing. Generally the raffinate stream which contains meta-xylene is directed to an isomerization zone for the production of additional amounts of desired para-xylene.

SUMMARY OF THE INVENTION

Accordingly, it is an object of the present invention to provide a novel process for recovering and producing high purity meta-xylene concurrently and simultaneously with high purity para-xylene and, if desired, high purity ortho-xylene from a $C_8$ aromatic mixture containing the same and ethylbenzene. This object is accomplished by a combination of fractionation, selective adsorption, fractional crystallization, and isomerization uniquely arranged to reduce the para- and ortho-xylene content of the feed to the crystallization unit to below that of the para/meta and ortho/meta eutectics, thereby allowing the separation of high purity meta-xylene, and enabling one to alter somewhat, the relative amounts of each isomer to be produced.

In one embodiment, therefore, the present invention presents a process for the simultaneous production of high purity meta-xylene and high purity para-xylene from a fresh feed stream containing $C_8$ aromatics which comprises separating, in a selective adsorption zone, a hereinafter described stream of mixed $C_8$ aromatics to produce a high purity para-xylene stream and a para-xylene deficient stream containing para-xylene in an amount below that of the para-xylene and meta-xylene eutectic mixture; fractionating said para-xylene deficient stream to produce an overhead fraction containing ortho-xylene below that of the ortho/meta eutectic mixture and a bottoms fraction; separating, by crystallization, said overhead to produce a high purity meta-xylene and a recycle stream; contacting in an isomerization zone said bottoms fraction and said recycle stream with an isomerization catalyst maintained at isomerization conditions to produce the aforesaid stream of mixed $C_8$ aromatics approaching thermodynamic equilibrium composition; and, introducing said fresh feed stream into at least one of said aforementioned zones.

In another embodiment the present invention involves a process for the production and separation of high purity meta-xylene, concurrently with high purity para-xylene and high purity orthoxylene from a fresh feed stream containing $C_8$ aromatics which comprises first separating, by a first fractionation zone, said fresh feed stream to produce a relatively pure ortho-xylene fraction as bottoms and a first overhead fraction comprising ortho-xylene, meta-xylene, para-xylene and ethylbenzene. If desired, the ortho-xylene bottoms fraction could be further fractionated to remove any $C_9{}^+$ material and thereby further increase the ortho-xylene purity. The first overhead fraction is then separated by a selective adsorption zone to produce a relatively pure para-xylene stream and para-xylene deficient stream containing para-xylene in an amount below that of the para- and meta-xylene eutectic mixture. Preferably, this selective adsorption is effected by contacting the first overhead fraction with a mass of crystalline aluminosilicate adsorbent contained in an adsorption zone maintained at adsorption conditions to effect the selective retention of an extract material containing para-xylene. After the adsorbent mass has become saturated with the para-xylene, a desorbent material separable from xylenes by fractionation is supplied to displace the para-xylene. A raffinate containing the less selectivity retained $C_8$ aromatics plus excess desorbent is withdrawn from the adsorption zone and separated from desorbent by fractionation. Similarly, the extract stream is withdrawn from the absorbent mass in admixture with the desorbent and separated therefrom by fractionation. The para-xylene deficient and desorbent free fraction is then separated by a second fractionation zone to produce a second overhead stream and a second bottoms stream comprising meta-xylene and ortho-xylene and relatively free of ethylbenzene and para-xylene. This second bottoms stream is then further separated by a third fractionation zone to produce a third bottoms stream and a third overhead stream comprising a meta-xylene concentrate relatively free of ethylbenzene and containing para-xylene below the para/meta eutectic, and ortho-xylene below that of the ortho/meta eutectic mixture. From this meta-xylene concentrate, a pure meta-xylene fraction and a recycle stream are produced by a meta-xylene crystallizer. The second overhead stream, third bottoms stream and recycle stream produced in the steps above are contacted in an isomerization zone with an isomerization catalyst maintained at isomerization conditions to produce a stream of mixed $C_8$ aromatics approaching thermodynamic equilibrium composition. The mixture is then directed along with the fresh feed stream to the first fractionation zone.

Thus, in both embodiments, the known techniques of fractional distillation, selective adsorption, fractional crystallization and isomerization are combined to produce a high purity meta-xylene product in a heretofore unrecognized, more economical manner.

A more detailed description of the invention, objects and embodiments will be found in the following detailed description of the process of this invention.

DESCRIPTION OF PREFERRED EMBODIMENTS $C_8$ aromatic feedstocks containing ortho-xylene, meta-xylene, para-xylene and ethylbenzene to be used in the process of the present invention are readily available from either petroleum or coal sources in a manner well-known to those trained in the art. A particularly preferred source is the $C_8$ aromatic extract produced by a typical solvent extraction process from a pyrolysis gasoline or from a naphtha which has been reformed with a platinum-halogen containing catalyst. Also suitable as feedstock to the process of this invention are mixed xylenes produced by toluene disproportionation processes. Typical $C_8$ aromatics compositions from these various sources are shown in Table I. It will be noted that these compositions differ considerably from the normally accepted equilibrium $C_8$ aromatic distribution for the range of temperature usually employed for isomerization. Such equilibrium concentrations are shown in Table No. II. Suitable also as feedstock are $C_8$ aromatic cuts of reformates prepared by fractionation but without solvent extraction. Such feedstocks will contain varying amounts of non-aromatic hydrocarbons.

TABLE NO. I
Typical $C_8$ aromatics compositions from various sources

| Component | Catalytic reforming | Pyrolysis gasoline | Toluene disproportionation |
|---|---|---|---|
| Ethylbenzene, percent | 16 | 53 | Nil |
| Para-xylene, percent | 18 | 10 | 26 |
| Meta-xylene, percent | 44 | 25 | 50 |
| Ortho-xylene, percent | 22 | 12 | 24 |

TABLE NO. II
Equilibrium concentration of $C_8$ aromatics at various temperatures

| | Temperature, °F. | | |
|---|---|---|---|
| | 620 | 800 | 980 |
| Ethylbenzene, percent | 6 | 8 | 11 |
| Para-xylene, percent | 23 | 22 | 21 |
| Meta-xylene, percent | 50 | 48 | 45 |
| Ortho-xylene, percent | 21 | 22 | 23 |

In the process of the present invention, no novelty is asserted as to any of the individual steps employed therein with the novel invention residing in the unique manner in which these steps are combined, as will be described below.

According to the process of the present invention, a fresh $C_8$ aromatic feedstock of the type described, commingled with a stream of mixed $C_8$ aromatics produced by isomerization and approching thermodynamic equilibrium composition, is separated by a first fractionation zone, to produce a relatively pure ortho-xylene fraction (at least about 95% pure) and an overhead fraction enriched in ethylbenzene, meta- and para-xylene concentrations and reduced in ortho-xylene concentration. Note that it is not necessary to the scheme of this invention that the overhead fraction be devoid of ortho-xylene. This results in a less difficult fractionation which can be effected with less expensive fractionation equipment. This fractionation is readily effected by means well known to those trained in the art; a single fractionator or a series of two fractionators may be used in this first fractionation zone depending on the desired purity of the ortho-xylene. A preferred mode of effecting this fractionation entails the utilization of a two-step fractionation system. In this mode of operation the ortho-xylene concentrate (at least about 90% orthoxylene) produced as the bottoms product from the first fractionator is then further fractioned in a second fractionator to produce a relatively pure (at least about 95% pure) ortho-xylene overhead fraction and any $C_9{}^+$ aromatic contaminants as a bottoms fraction. It is also within the scope of this invention to reject only $C_9{}^+$ aromatic contaminants as bottoms from the first fractionation zone. In this case the ortho-xylene is retained for isomerization to the other xylenes rather than being removed from the process as a product stream.

The overhead fraction produced in the described fractionation step is separated by selective adsorption to produce a relatively pure para-xylene stream (i.e., containing less than 1% other $C_8$ aromatics) and an ortho-xylene, ethyl-benzene meta-xylene fraction which contains para-xylene below that of the meta-para eutectic level of about 86% metal and 14% para-xylene. This step is an essential and unique part of the present invention because to allow the ultimate recovery of high purity (about 99%) meta-xylene it is necessary to reduce paraxylene concentration below that of the meta-para eutectic. Only this step at present can achieve the necessary reduction; para-xylene fractional crystallization will not achieve this result (limited by the meta-para eutectic composition of about 86% meta, 14% para) nor will fractionation (para-meta boiling points are too close). This separation, hereafter described in more detail, is accomplished by utilizing crystalline aluminosilicates (molecular sieves) selective for para-xylene.

The relatively para-xylene free (containing para-xylene in an amount less than the para/meta eutectic composition of about 14% para-xylene) fraction thus produced, containing ortho-xylene, meta-xylenes and ethylbenzene is then separated by a second fractionization zone to produce a second overhead fraction, to be recycled to a hereinafter described isomerization zone, and a second bottoms fraction diminished in ethylbenzene and lighter materials and containing ortho-xylene and meta-xylene. The primary purpose of this separation is to reduced as far as practical light diluents from the crystallizer feed. This required separation can be readily achieved, for example, with a fractionator having about 50 trays and operating at about a 6 to 1 reflux to feed ratio.

The second bottoms fraction thus produced is then further separated by a third fractionation zone to produce a third overhead stream comprising a meta-xylene concentrate relatively free of both ethylbenzene and para-xylene (less than about 5% each on a $C_8$ aromatic basis), and containing ortho-xylene below that of the meta/ortho-xylene eutectic concentration of about 67% meta- and 33% ortho-xylene. The third bottoms fraction, comprising metal-xylene and ortho-xylene is to be recycled to a hereinafter described isomerization zone. Since the feed to this fractionator is relatively ethylbenzene and para-xylene free, the purpose of the separation is then to reduce the ortho-xylene concentration in the overhead stream to less than that of the meta/ortho-xylene eutetic of about 67% meta- and 33% ortho-xylene. In particular it is preferred that the overhead stream contain less than about 5% ortho-xylene on a $C_8$ aromatic basis.

The meta-xylene concentrate thus produced, now relatively ethylbenzene, para- and ortho-xylene free, is then separated by a meta-xylene crystallizer to produce high purity (about 99%) meta-xylene product and a mother liquor to be recycled to the isomerization zone described below. Such separation by conventional fractional crystallization techniques is well known to those trained in the art. The process of this invention not only makes possible the recovery of high purity meta-xylene via fractional crystallization but, further, the crystallizer is able to operate at a higher, less expensive temperature level.

The aforementioned second overhead fraction, third bottoms fraction, and the meta-xylene crystallizer mother liquor are then recycled to an isomerization zone, maintained at isomerization conditions to direct the $C_8$ aromatics toward equilibrium concentrations of ortho-xylene, meta-xylene, para-xylene and ethylbenzene. This isomerization reaction is effected by means well known to those trained in the art by employing isomerization catalysts and conditions capable of isomerizing not only the xylenes but also capable of isomerizing ethylbenzene to xylenes. Since this ethylbenzene isomerization requires the ethylbenzene to go through a naphthene intermediate before the formation of a xylene, it is necessary to utilize an isomerization catalyst having a dual, acid-acting and hydrogenation-dehydrogenation function. This hydrogenation-dehydrogenation function is typically provided by a hydrogenation-dehydrogenation active metallic component such as a metal from Groups VI-B, VIII and I-B of the Periodic Table of Elements, preferably the platinum group metals, and particularly platinum. This metallic component is then combined in catalytically effective amounts, such as 0.1 to about 5 wt. percent, with an acidic refractory inorganic oxide support such as halogenated alumina, silica-alumina, the hydrogen forms of faujasite or mordenite and combinations of alumina and mordenite or faujasite. A particularly preferred catalytic composite comprises about 0.1 to about 2 wt. percent platinum and about 0.1 to about 5 wt. percent fluorine and/or chlorine combined with a gamma alumina carrier material. Suitable catalysts and operating conditions for this step are described, for example, in U.S. Pats. 3,078,318 and 3,538,173.

The isomerization reaction itself is effected in an isomerization zone wherein the catalyst is utilized either as a fixed bed or moving bed with the reactants contacting the catalyst in an upflow, downflow or radial flow pattern. Preferred is a fixed bed, vapor phase, down flow system. Suitable isomerization condition under which the isomerization zone is maintained include a temperature of about 200° C. to about 650° C., particularly about 350° C. to about 550° C., pressures of about atmospheric to about 100 atmospheres and liquid hourly space velocities of about 0.1 to about 10 hr.$^{-1}$. Mild hydrogenating conditions including the presence of hydrogen at a hydrogen at hydrocarbon mole ratio of 0.5:1 to about 20:1 are preferred. Any $C_7^-$ and/or $C_9^+$ hydrocarbons produced by side reactions are readily removed by conventional fractionation techniques. Further, in some instances, halogen addition to the isomerization zone feedstock may be effected to control or maintain catalyst activity. Depending on activity desired, halogen concentrations from about 1 to about 1000 p.p.m. weight can be utilized.

The resultant stream of mixed $C_8$ aromatics, approaching thermodynamic equilibrium concentrations of ortho-xylene, meta-xylene, para-xylene and ethylbenzene, is then directed along with the fresh feed stream of $C_8$ aromatics to the previously described first fractionation zone.

In the selective adsorption step hereinbefore mentioned, an important factor used to determine the ability of a particular adsorbent to separate para-xylene from the other $C_8$ aromatic isomers is the selectivity of the adsorbent for one isomer compared to the other isomers. The selectivity (B) as used herein is defined as the ratio of the two isomers in an adsorbed phase over the ratio of the same two isomers in an unadsorbed phase at equilibrium conditions and is expressed in Equation 1 below, $$\text{Selectivity} = B_{x/y} = \frac{(x/y)_a}{(x/y)_u} \quad (1)$$

where $x$ and $y$ feed represent para-xylene and another isomer respectively, in volume percent, and the subscripts $a$ and $u$ represent the adsorbed and unadsorbed phases respectively. The equilibrium conditions as defined here were determined when a feed containing these two isomers was passed over a bed of adsorbent and did not change composition after contacting the bed of adsorbent; in other words, there was no net transfer of material occurring between the unadsorbed and adsorbed phases when the selectivity of the two isomers was measured.

As can be seen, where the selectivity of the two isomers approaches unity, there is no preferential isomer adsorption by the adsorbent. As the value of B becomes greater than unity, there is a preferential selectivity by the adsorbent of one isomer. When comparing the selectivity of para-xylene over meta-xylene, a B larger than unity indicates preferential adsorption of para-xylene within the adsorbent while a B less than unity would indicate the inverse.

In adsorptive-separation processes, separation can be effected through the use of a crystalline aluminosilicate zeolite adsorbents. Common zeolites which can effectively separate the various aromatic isomers are the synthetically-prepared Type X and Type Y zeolites containing selected cations at the exchangeable cationic sites within the zeolite crystal structure.

Both the natural and synthetic aluminosilicates may be used as adsorbents in the present invention. A crystalline zeolitic aluminosilicate encompassed by this step of the present invention for use as an adsorbent includes those wherein the aluminosilicate has cage structures in which the alumina and silica tetrahedra are intimately connected with each other in an open, three-dimensional crystalline network with the tetrahedra cross-linked by the sharing of oxygen atoms. The spaces between the tetrahedra are occupied by water molecules prior to dehydration. Subsequent, partial or total dehydration results in crystals interlaced with channels of molecular dimensions. Thus, the crystalline aluminosilicates are often referred to as molecular sieves. In the hydrated form, the crystalline aluminosilicates may be represented by the formula represented in Equation 2, $$M_{2/n}O:Al_2O_3:wSiO_2:yH_2O \quad (2)$$

where M is a cation which balances the electrovalence of the tetrahedra, $n$ represents the valence of the cation, $w$ represents the moles of $SiO_2$, and $y$, the moles of water. The cations may be any one of a number of cations such as, for example, certain selected cations from the alkali metal cations or the alkaline earth cations.

Crystalline aluminosilicates which find use as adsorbents in the process of this invention possess relatively well-defined pore structures. The exact type aluminosilicate is generally referred to by the particular silica-alumina ratio and the pore dimensions of the cage structures. The faujasites are commonly represented as Type X and Type Y structured aluminosilicates and are defined by their varying silica to alumina ratios.

The Type X structured zeolite can be represented in terms of the mole ratio of oxides as represented in the following Equation 3, $$(0.9\pm0.2)M_{2/n}O:Al_2O_3:(2.5\pm0.5)SiO_2:yH_2O \quad (3)$$

where M represents at least one cation having the valence of not more than three, $n$ represents the valence of M, and $y$ is a value up to about 8, depending upon the identity of M and the degree of hydration of the crystal. Zeolite Type X is described in U.S. Pat. No. 2,882,244.

The Type Y structured zeolite may be represented in the terms of the mole ratio of oxides for the sodium form as represented in the following Equation 4, $$(0.9\pm0.2)Na_2O:Al_2O_3:wSiO_2:yH_2O \quad (4)$$

where $w$ is a value of from about three to about 9, and $y$ is a value less than 8.

The exchangeable cationic sites for the Type X and Type Y zeolites, in general, can be defined as represented in Equation 2 above as "M."

Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange, or base exchange methods, that the cation exchange may take place either by using individual solutions of the desired cations to be placed on the molecular sieve or by using exchange solutions containing mixtures of the cations which are desired to be exchanged onto the crystalline aluminosilicate zeolite.

In this specification, the terms Type X and Type Y structured zeolites shall refer to the basic crystalline aluminosilicates described in Equations 3 and 4 above which contains one or a combination of cations.

The cations or metals which can be placed on the Type X or Type Y structured zeolites include potassium, barium, silver, cesium, praseodymium, neodymium, samarium, and combinations thereof.

The adsorption zone which employs the previously described adsorbents selectively adsorbs a particular isomer from the $C_8$ aromatic feedstock passed into that zone. Specifically, where a $C_8$ aromatic mixture is fed into the adsorption zone containing a selected adsorbent, para-xylene is selectively retained by the adsorbent while the other isomers in the feed mixture occupy the external volume surrounding the adsorbent and are not adsorbed with the degree of tenacity that the selectively retained isomer, para-xylene, is adsorbed. Typically, the basic operating conditions can include passage of the feedstock in liquid or vapor phase through a bed of an adsorbent material. For ease of separation and for optimum contact area, the adsorbent is a small particle material and is generally 20 to 40 mesh in size. The $C_8$ aromatic feedstock is contacted with the adsorbent at conditions which allow a portion of the feedstock and typically substantially all of a particular isomer present in the feedstock to be retained by the adsorbent. The less selectively retained isomers of the feed, typically referred to as the raffinate material in the art, are removed from the adsorbent bed by contact with a third stream consisting either of another hydrocarbon or a gaseous material. In some instances the third stream is a material which can desorb the selectively retained components of the feed but which is diluted with another hydrocarbon or other material to such an extent that there is no desorption of the selectively retained material. A mere washing of the adsorbent of raffinate material then occurs. Thus, para-xylene is selectively retained and other $C_8$ aromatic isomers are recovered as the raffinate. Thereafter, the adsorbent is contacted with a desorbent material separable from the xylenes by fractionation at desorption conditions to effect the removal of the selectively retained paraxylene from the adsorbent. The adsorption and desorption operating conditions can be effected in either liquid or vapor phase at substantially the same or different pressures and/or substantially the same or different temperatures. Adsorption conditions can include temperatures in the range of from about ambient to about 250° C. and pressures generally above atmospheric and in most instances within the range from about atmospheric to about 500 p.s.i.g. In some instances, both vapor and liquid combination operations can be effected, that is, adsorption can be effected in a liquid phase and desorption in the vapor phase, or adsorption in the vapor phase and desorption effected in the liquid phase with various temperature and/or pressure changes associated with the requirements to perform the operations in different phases.

The overall operations effected in the adsorption zone can be performed by typical swing-bed type operations or by employing the simulated moving-bed countercurrent flow operations. It is well known to those skilled in the separation art that manifold systems can be incorporated, where swing-bed operations are to be used, to allow continuous production of extract and raffinate streams by manipulating the input and output streams to the individual adsorption beds to effect continuous adsorption and desorption steps. The simulated moving-bed, countercurrent flow operations are typically performed through the use of a series of inlet and outlet lines connected to an elongated bed of adsorbent which lines are advanced in the direction of the general fluid flow through the fixed-bed by using a particular type of a rotating valve which allows the various operations to take effect simultaneously at different areas of the fixed-bed. When observing the operations from a certain location within the adsorption bed, adsorption and desorption cycles are seen in a repetitive manner and in a way which allows the efficient production of the desired extract and raffinate streams. The overall countercurrent fixed-bed simulated moving-bed type operations are generally demonstrated in U.S. Pat. No. 2,985,589. Preferably, operations of the adsorption or separation zone of this invention are similar to the operations disclosed in that reference patent.

Desorbents which can be used in the operation of the adsorption zone include aromatics such as benzene, toluene, diethylbenzenes or other aromatics which will easily displace the extract material from the adsorbent and which are relatively easily separated by fractionation from the xylenes contained in the raffinate and extract streams. Preferred desorbents are toluene or diethylbenzene. Additionally, gases may be used as a desorption medium in cases where the desorption step is carried out at a temperature higher than the temperature at which the para-xylene or meta-xylene is adsorbed or a pressure lower than the pressure at which adsorption occurs.

DESCRIPTION OF THE DRAWING AND ILLUSTRATIVE EMBODIMENT

The process of the present invention can be most clearly described by reference to the attached drawing, schematically illustrating the production and recovery of high purity meta-xylene, para-xylene and ortho-xylene isomers from a mixed $C_8$ aromatic feedstock. Of necessity, certain limitations must be present in a diagram of the type presented and no intention is made thereby to unduly limit the scope of this invention to reactants, concentrations, flow rates, operating conditions, or catalysts. Miscellaneous appurtenances including valves, pumps, compressors, separators, reboilers and the like have been eliminated. Only those vessels and lines necessary for a complete and clear understanding of the present invention are illustrated, with any obvious modifications made by those possessing expertise in the art of $C_8$ aromatics isomerization and recovery being included within the generally broad scope of the present invention.

Referring now to the schematic diagram. A fresh feed stream containing $C_8$ aromatics enters the process of the present invention via line 1 and is admixed with a hereinafter described isomerization zone 5 effluent, denuded of light components, entering via line 26. The mixture is passed via line 1 to provide to first fractionation zone 2 a feed comprising on a $C_8$ aromatic basis: 45.1 units (moles per hour) of ethylbenzene, 57.7 units of para-xylene, 145.0 units of meta-xylene and 62.6 units of ortho-xylene. Removed as bottoms from first fractionation zone 2 via line 4 is a relatively pure (about 92 wt. percent ortho-xylene fraction comprising 21.3 units of ortho-xylene and 1.9 units of $C_9^+$ aromatics. Should higher ortho-xylene purity be desired, the $C_9^+$ aromatics can be separated by subsequent fractionation in a rerun column not shown. Alternately, if a lesser quantity of ortho-xylene is desired, the fresh feed stream may be introduced to the process through line 27 to selective adsorption zone 6 described below. Removed as overhead from first fractionation zone 2 via line 3 is a stream containing 45.1 units of ethylbenzene, 57.7 units of para-xylene, 145.0 units of meta-xylene and 41.3 units of ortho-xylene.

This overhead fraction is passed via line 3 to selective adsorption zone 6 wherein the para-xylene is allowed to be adsorbed by a selective crystalline aluminosilicate zeolite and the non-selectively retained other $C_8$ aromatic isomers are withdrawn from the adsorbent contained in selective adsorption zone 6 as a raffinate stream via line 8.

This raffinate stream is then further purified in raffinate-fractionator 10 to remove therefrom desorbent as bottoms via line 14 and as overhead via line 13 a raffinate product relatively free of para-xylene containing about 45.1 units of ethylbenzene, 8.7 units of para-xylene, 145.0 units of meta-xylene and 41.3 units of othro-xylene. The adsorbent contained in separation zone 6 is then contacted with the desorbent material, diethylbenzene, entering via line 15 which displaces the selectively adsorbed para-xylene from the adsorbent. The para-xylene, along with desorbent, is then removed via line 7 and passed to extract fractionator 9 wherein the desorbent is removed as bottoms via line 12 and the para-xylene product containing about 48.8 units of para-xylene and about 0.1 units each of meta- and ortho-xylene is removed via line 11. It should be noted that the system as illustrated employs a desorbent having a higher boiling point than the xylenes, such as diethylbenzene, but our invention is not intended to be restricted thereto; a desorbent having a boiling point lower than the xylene can also be employed. Such a low boiling desorbent, as for example toluene, would then of course be removed as overhead streams rather than bottoms streams from raffinate fractionator 10 and extract fractionator 9.

More particularly, separation zone 6 contains an adsorbent which is a Type X structured zeolite and which contains about 1.3 wt. percent sodium, 3.5 wt. percent potassium, and 18.6 wt. percent barium. The adsorbent is about 20–40 mesh size and has a density of about 48 pounds per cubic foot. The adsorption and desorption operations are effected at 350° F. and 140 p.s.i.g. to result in a liquid phase operation. Desorbent streams removed as bottoms from fractionators 9 and 10 via lines 12 and 14 are then recycled via line 15 for reuse during the desorption operation. Although not shown at least a portion of the recycled desorbent would be rerun before being reused in the separation step in a fractionator to remove any impurities boiling at temperatures higher than that of the desorbent.

The overhead raffinate fraction from raffinate fractionator 10 is passed via line 13 to a second fractionation zone 16 to produce a bottoms fraction removed via line 18 and which contains about 1 unit each of ethylbenzene and para-xylene, about 40.0 units of meta-xylene and about 36.0 units of ortho-xylene. Removed as overhead from the second fractionation zone 16 via line 17 is a recycle stream which is directed via line 24 to isomerization zone 5.

Bottoms material from second fractionation zone 16 is directed via line 18 to a third fractionation zone 19 to produce an overhead stream, removed via line 20, containing 1.0 units each of ethylbenzene and para-xylene, 30.0 units of meta-xylene and 1.2 units of ortho-xylene. The bottoms fraction from third fractionation zone 19 removed via line 21 contains essentially nil units of para-xylene and ethylbenzene, 10.0 units of meta-xylene and 34.8 units of ortho-xylene and is recycled via line 24 to isomerization zone 5.

The overhead stream from third fractionation zone 19 is then passed to meta-xylene crystallizer 22 via line 20 wherein 19.0 units of high purity meta-xylene product containing less than 0.2 units of ethylbenzene, para- or ortho-xylene are separated and removed via line 23. A residual mother liquor stream amounting to 14.2 units, and predominantly meta-xylene, is removed via line 24 and recycled via the same line to isomerization zone 5.

The recycle stream passing through line 24 enters isomerization zone 5 which is maintained under isomerization conditions to effect the production of additional amounts of the recovered xylenes. In addition, a $C_8$ aromatic stock deficient in a desired xylene isomer may first enter the general process of the present invention via line 25 and pass to isomerization zone 5 via line 24 instead of entering the process via line 1 as previously described.

More specifically, isomerization zone 5 contains an isomerization catalyst containing about 0.4% platinum and about 2% fluorine combined with a spherical, gamma-alumina support. Suitable isomerization conditions to effect the isomerization of the ethylbenzene contained in the feed to isomerization zone 5 include a liquid hourly space velocity of about 2 hr.$^{-1}$, a reactor pressure of about 175 p.s.i.g., a reactor temperature of about 750° F., a hydrogen to hydrocarbon mole ratio to the reactor zone of about 6:1 and a chlorine addition to the reactor feed of about 50 parts per million (weight). The resultant product from isomerization zone 5, comprising a stream of mixed $C_8$ aromatics approaching thermodynamic equilibrium composition, is then removed via line 26 and admixed with the fresh feed stream entering line 1 and the mixture is passed to fractionation zone 2 through line 1 as previously described. Any $C_7^-$ hydrocarbons formed as a result of side reactions in isomerization zone 5 may be removed, by fractional distillation means not shown, from line 26 to prevent any accumulation of these species in the process of this invention.

I claim as my invention:

1. A process for the simultaneous production of high purity meta-xylene and high purity para-xylene from a fresh feed stream containing $C_8$ aromatics which comprises:

(a) separating, in a selective adsorption zone, a hereafter described stream of mixed $C_8$ aromatics to produce a high purity para-xylene stream and a para-xylene-deficient stream containing para-xylene in an amount below that of the para-xylene and meta-xylene eutectic mixture;

(b) fractionating said para-xylene-deficient stream to produce an overhead fraction containing meta-xylene and ortho-xylene in an amount below that of the ortho-xylene and meta-xylene eutectic mixture and a bottoms fraction;

(c) separating, by crystallization, said overhead to produce high purity meta-xylene and a recycle stream;

(d) contacting in an isomerization zone said bottoms fraction and said recycle stream with an isomerization catalyst maintained at isomerization conditions to produce the aforesaid stream of mixed $C_8$ aromatics approaching thermodynamic equilibrium composition; and, (e) introducing said fresh feed stream into at least one of said aforementioned zones.

2. The process of claim 1 further characterized in that said fresh feed stream is introduced into the selective adsorption zone.

3. The process of claim 1 further characterized in that said fresh feed stream is introduced into the isomerization zone.

4. The process of claim 1 further characterized in that said fresh feed stream is introduced into the selective adsorption zone and the isomerization zone.

5. A process for the production and recovery of high purity meta-xylene from a fresh feed stream containing $C_8$ aromatics which comprises the steps of:

(a) separating, in a first fractionation zone, said fresh feed stream to produce a first bottoms fraction comprising relatively pure ortho-xylene and a first overhead fraction comprising ethylbenzene, para-xylene, meta-xylene and ortho-xylene;

(b) separating, in a selective adsorption zone, said first overhead fraction to produce a relatively pure para-xylene stream and a para-xylene deficient stream containing para-xylene in an amount below that of the para-xylene and meta-xylene eutectic mixture;

(c) separating, in a second fractionation zone, said para-xylene-deficient stream to produce a second overhead stream and a second bottoms stream comprising meta-xylene and ortho-xylene and relatively free of ethylbenzene and para-xylene;

(d) separating, in a third fractionation zone, said second bottoms stream to produce a third bottoms stream and a third overhead stream comprising a meta-xylene concentrate relatively free of ethylbenzene and para-xylene, and containing ortho-xylene in an amount below that of the ortho- and meta-xylene eutectic mixture;

(e) separating, in a meta-xylene crystallizer, said meta-xylene concentrate to produce a high purity meta-xylene fraction and a recycle fraction;

(f) contacting in an isomerization zone said second overhead stream, third bottoms stream, and recycle stream with an isomerization catalyst maintained at isomerization conditions to produce a stream of mixed $C_8$ aromatics approaching thermodynamic equilibrium composition; and (g) directing said stream of mixed $C_8$ aromatics commingled with said fresh feed stream to said first fractionation zone.

6. The process of claim 5 wherein said selective adsorption separation zone of step (b) comprises the steps of:

(a) contacting said first overhead fraction with a mass of crystalline aluminosilicates contained in an adsorption zone maintained at adsorption conditions to effect the selective retention of para-xylene;

(b) withdrawing from said adsorption zone a raffinate stream containing less selectively retained xylene isomers;

(c) contacting said adsorbent mass at desorption conditions with a desorbent material to effect a removal of the extract material from the adsorbent; and (d) withdrawing from the adsorbent mass an extract stream comprising said extract material and desorbent.

7. The process of claim 6 wherein said extract stream comprises para-xylene.

8. The process of claim 6 wherein said adsorption and desorption are effected in the liquid phase.

9. The process of claim 6 wherein said desorbent is toluene or a diethylbenzene.

10. The process of claim 6 wherein said aluminosilicate is a Type X or Type Y structured zeolite.

11. The process of claim 10 wherein said zeolites contain cationic sites occupied by a metal selected from the group consisting of potassium, barium, silver, cesium, praseodymium, neodymium, samarium, and combinations thereof.

References Cited

UNITED STATES PATENTS

| | | | |
|---|---|---|---|
| 2,777,888 | 1/1957 | Hoff et al. | 260—674 |
| 3,133,126 | 5/1964 | Fleck et al. | 260—674 |
| 3,584,068 | 6/1971 | Jackson et al. | 260—674 |
| 3,636,121 | 1/1972 | Stine et al. | 260—674 |
| 3,636,180 | 1/1972 | Broughton | 260—674 |
| 3,624,172 | 11/1971 | Adams | 260—674 |
| 3,700,744 | 10/1972 | Berger et al. | 260—674 |

DELBERT E. GANTZ, Primary Examiner

C. E. SPRESSER, JR., Assistant Examiner

U.S. Cl. X.R.

260—668 A, 674 SA